(12) United States Patent
Negus

(10) Patent No.: US 7,035,283 B2
(45) Date of Patent: Apr. 25, 2006

(54) ASYMMETRIC DATA TRAFFIC THROUGHPUT IN CSMA/CA NETWORKS

(76) Inventor: Kevin J. Negus, 4930 Alkali Rd., Hyattville, WY (US) 82428

( * ) Notice: Subject to any disclaimer, the term of this patent is extended or adjusted under 35 U.S.C. 154(b) by 889 days.

(21) Appl. No.: 09/828,279

(22) Filed: Apr. 6, 2001

(65) Prior Publication Data

US 2001/0055312 A1 Dec. 27, 2001

Related U.S. Application Data

(60) Provisional application No. 60/195,638, filed on Apr. 7, 2000.

(51) Int. Cl.
*H04J 3/16* (2006.01)
*H04L 12/413* (2006.01)

(52) U.S. Cl. ...................... 370/469; 370/445

(58) Field of Classification Search ............... 370/445, 370/447, 428, 469, 236.2; 714/4, 15, 18, 714/746–748; 709/230, 232, 237
See application file for complete search history.

(56) References Cited

U.S. PATENT DOCUMENTS

| | | | |
|---|---|---|---|
| 6,345,302 B1* | 2/2002 | Bennett et al. | 709/236 |
| 6,546,001 B1* | 4/2003 | Semper et al. | 370/349 |
| 6,553,006 B1* | 4/2003 | Kalliokulju et al. | 370/310 |
| 6,778,509 B1* | 8/2004 | Ravishankar et al. | 370/322 |

OTHER PUBLICATIONS

Tourrilhes J: "PiggyData: reducing CSMA/CA collisions for multimedia and TCP connections" Vehicular Technology Conference, 1999. VTC 1999—Fall. IEEE VTS 50th Amsterdam, Netherlands Sep. 19-22, 1999, Piscataway, NJ, USA, IEEE, US, Sep. 19, 1999, pp. 1675-1679, XP010353242 ISBN: 0-7803-5435-4.
Page from Supplementary European Search Report, EP 01 92 6821.

* cited by examiner

*Primary Examiner*—Duc Ho
(74) *Attorney, Agent, or Firm*—Thelen Reid & Priest LLP

(57) ABSTRACT

This application describes a modification to a wireless communication system protocol Medium Access Control layer in which certain short medium access control layer acknowledgments have higher layer acknowledgments appended to them in order to prevent the requirement of a data receiving node needing to contend for the wireless medium under asymmetric data traffic flow.

11 Claims, 4 Drawing Sheets

ASYMMETRIC DATA TRAFFIC THROUGHPUT IN CSMA/CA NETWORKS

RELATED APPLICATION

This application is a conversion of Provisional Application No. 60/195,638 filed Apr. 7, 2000.

BACKGROUND OF THE INVENTION

The present invention relates to wireless communication systems.

A popular Medium Access Control (MAC) method for wireless local area networks (WLAN) devices is the Carrier Sense Multiple-Access/Collision Avoidance (CSMA/CA). This method works by measuring the time since the last activity on the shared channel in equal length contention slots. Each transmitting node in the network generates a random number, then counts the number of contention slots until the number is reached. At that point, the node can grab the channel and other nodes must suspend their count until the channel is free again. If, by chance, two nodes generate the same random number and, thus, collide, they determine that the packet transfer is unsuccessful through the acknowledgment process and generate a new random number to start counting slots from zero the next time the channel is free.

After a node has successfully received a message, it sends an acknowledgment back over the wireless communication channel to the transmitting node. The other nodes do not begin contending for the medium until after the acknowledgment is sent by the receiving node. Note that typically, for local area networks, above the MAC layer are higher level communication layers, such as TCP/IP layers, under the control of the operating system. These TCP/IP layers have their own message and acknowledgment signals. For Windows-based systems, typically the TCP protocol is fixed to have a single acknowledgment for every two TCP message transfers. The acknowledgment at the TCP level is distinct from the acknowledgment at the MAC layer. In fact, each TCP acknowledgment requires a MAC layer message containing the acknowledgment with its own MAC layer acknowledgment of the TCP acknowledgment message.

A key metric for any wireless local area network system is the peak data rate in transferring data from one node to another without no other intentional traffic on the network. For most applications today, the data transfer will occur using the Transmission Control Protocol/Internet Protocol (TCP/IP). TCP/IP decouples the user from the details of the physical media and MAC layer use for the data transfer. However, in the case of wireless LANs, the interaction between the lower layer Medium Access Control (MAC) protocol and the upper layer (TCP) protocol has a serious impact on the data rate especially in the peak scenario. In a typical TCP implementation, such as those used in Windows based systems, an acknowledgment is sent for every other TCP segment of 1460-bytes. Thus, in a system where, for example, two TCP segments are sent in every CSMA/CA data packet, another tiny 64-byte payload packet TCP acknowledgment will contend for the media in response to every MAC layer message even though the only real data traffic is one-way which should not cause contentions. The effect of the small contending TCP acknowledgment packets on data throughput can be severe. Even though the message payload is small (only 64 bytes), all the overhead is required as for a large packet. For example, in the HomeRF Shared Wireless Access Protocol (SWAP) specification at 10 Mb/s data payload rate, the 1460-byte TCP segment message packet is typically about 3 ms long, while a 64-byte contending acknowledgment packet is about 2.4 ms long. If sent for every other message payload, this alone would be a 40% decrease in throughput. Additionally, CSMA/CA collisions can occur when both the TCP packet and the TCP acknowledgment packet randomly choose the same slot number. Dead time is created from the collision and both contending packets can see additional delays due to exponentially increasing contention times.

BRIEF DESCRIPTION OF THE PREFERRED EMBODIMENT

Figure 1A:
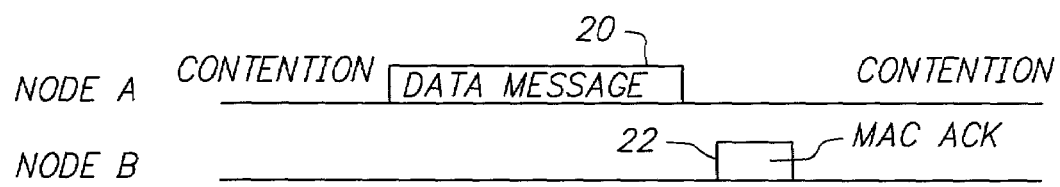
FIG. 1A illustrates a prior art example of a wireless MAC layer signaling.

FIG. 1 illustrates prior-art MAC layer signaling, for example, the signaling used in the CSMA/CA. In this embodiment, after a contention period, node A has access to the medium and transmits a data message 20 to the node B. The node B, after receiving the data message 20, sends a MAC layer acknowledgment 22 to the node A. Since all of the nodes expect the MAC layer acknowledgment 22 after the data message, the contention period for the nodes occurs only after the expected time for the MAC acknowledgment 22.

Figure 1B:
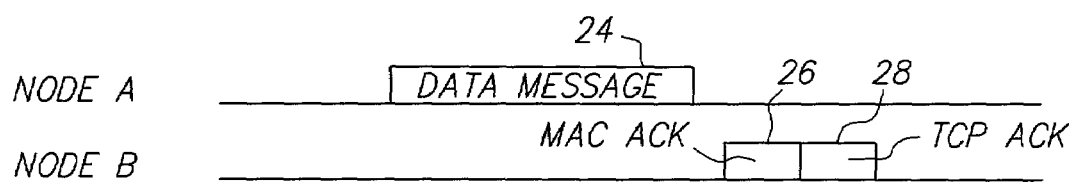
FIG. 1B illustrates a modified wireless MAC layer signaling of the method of the present invention.

FIG. 1B illustrates the method of the present invention. In this method, in some cases, after a data message 24 is transmitted from node A to node B, node sends back both a MAC acknowledgment 26 and an appended TCP acknowledgment 28. This TCP acknowledgment typically has about 64 bytes of data and, thus, can be easily appended to the MAC acknowledgment without significantly slowing the operation of the system. The other nodes in the system will wait until the end of the TCP acknowledgment before contending for the medium. Note that the system is backward compatible with prior versions of the wireless MAC protocols since the prior wireless MAC protocols need not know that the TCP acknowledgment 28 is appended to the MAC acknowledgment 26 in order not to interfere with the transmissions from node B.

Figure 2A:
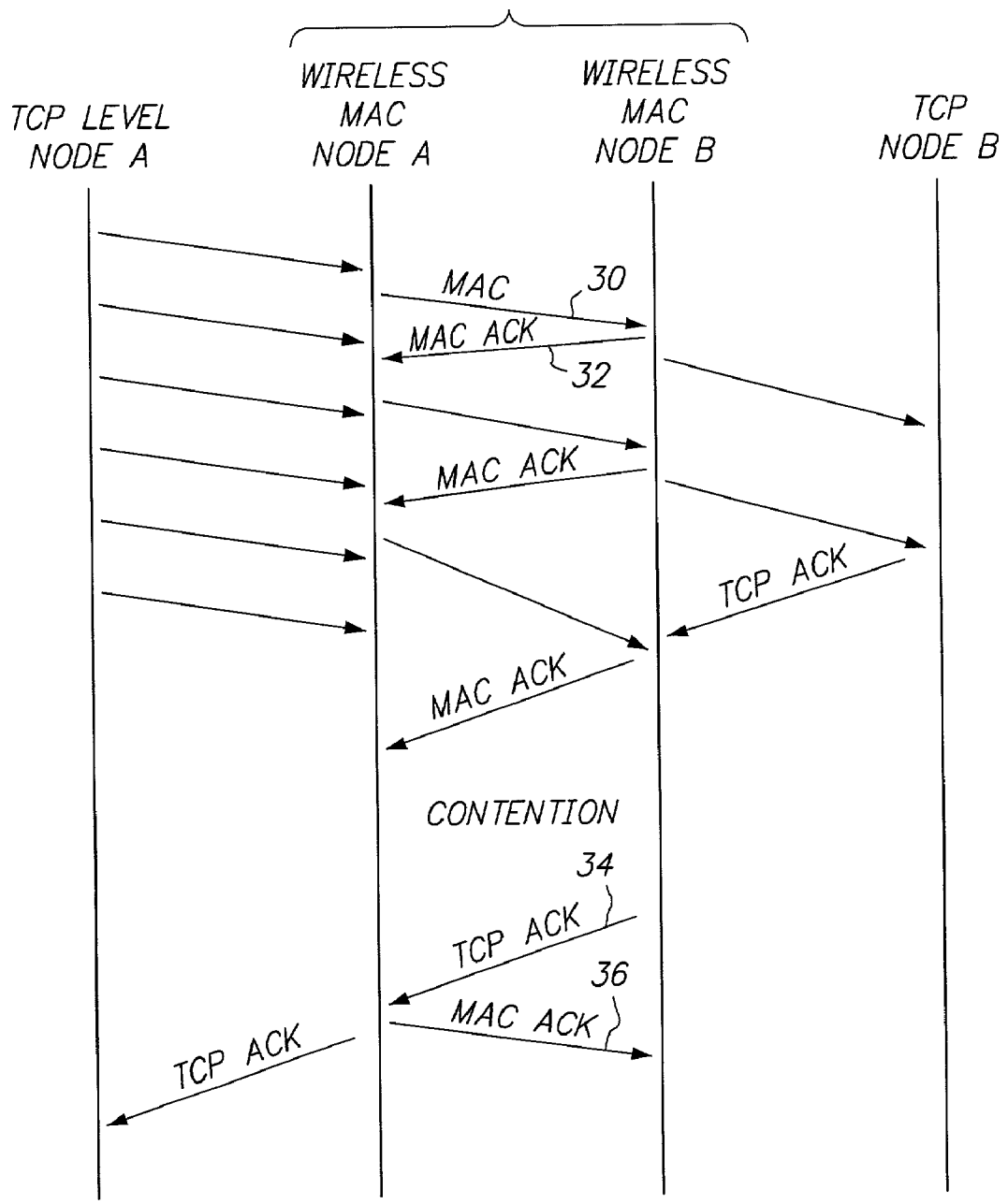
FIG. 2A illustrates a prior-art communication between two nodes along a wireless medium.

FIG. 2A illustrates a prior-art transmission across the wireless medium. A message 30 is transferred from wireless MAC node A to wireless MAC node B. A MAC acknowledgment 32 is then automatically transferred from node B to node A. After the TCP node B receives a number of messages, a TCP ACK message is produced to respond. Typically the TCP ACK message has 64-bytes of data, but will typically require a lot of overhead. The wireless node B needs to transfer the TCP acknowledge to the node A. This requires node B to contend for the medium even if node B is receiving data asymmetrically. For example, if node B is receiving a large amount of data, such as from a web page, from node A, the TCP acknowledgment still needs to transmitted as a MAC layer signal shown in Step 34. This MAC layer message containing the TCP ACK has its own MAC acknowledgment 36 from node A. Note that even though the TCP acknowledgment message is only 64 bytes long, it can use a lot of the wireless medium bandwidth, due to both the transmission overhead as well as the contention period.

In the contention period, the nodes randomly choose a slot to begin the transmission. If a relatively small number of slots are used, the number of potential conflicts of the transmissions can be high. A small number of slots would otherwise be useful in a situation where the asymmetric data transfer is common. However, the need to transmit TCP acknowledgments reduces the desirability of using a small number of slots. A problem with using a relatively large number of slots is that it increases the system delay before a node can transmit.

Figure 2B:
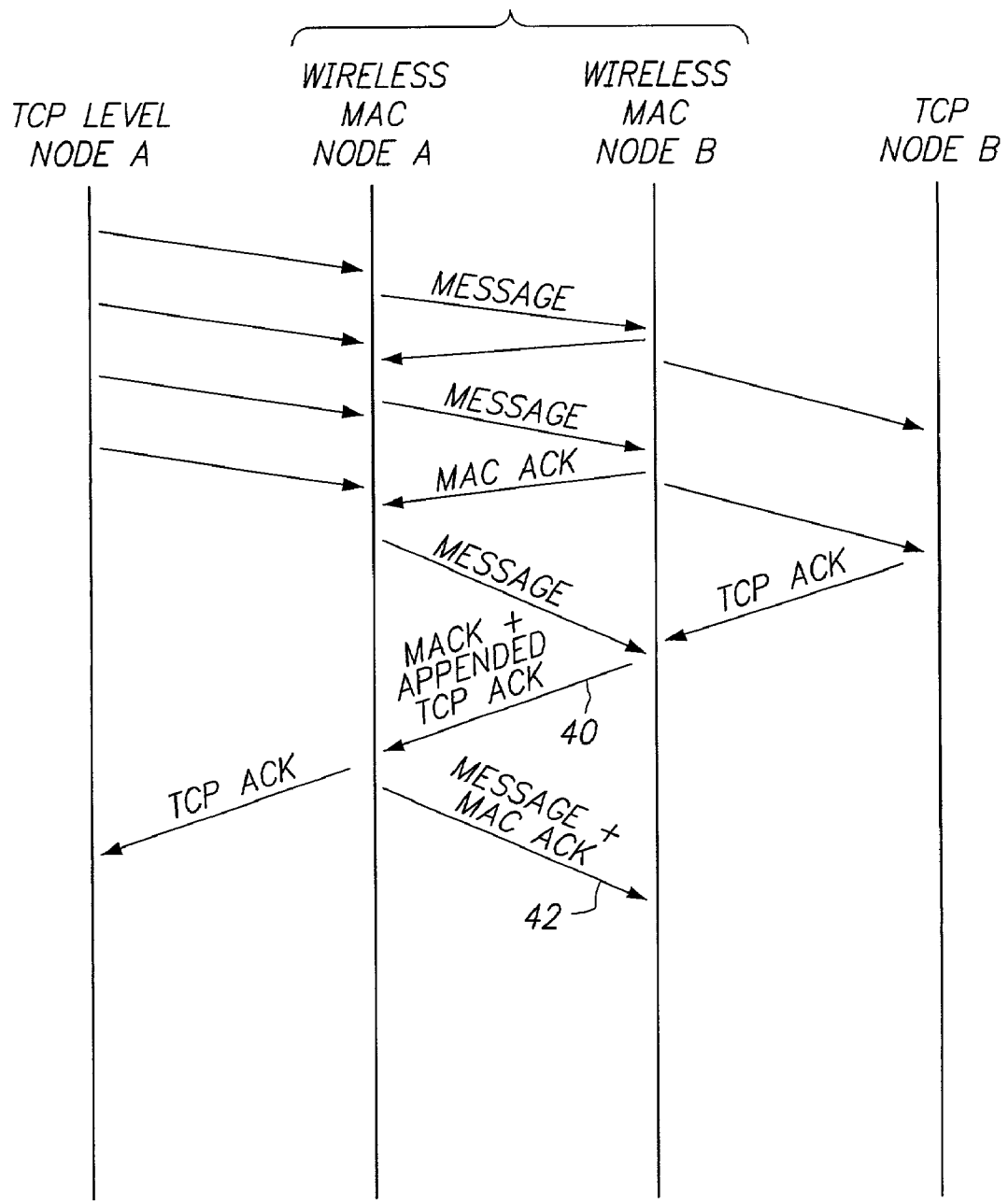
FIG. 2B illustrates the improved signaling along the wireless medium for an embodiment of the present invention.

In the embodiment of FIG. 2B, once a TCP acknowledgment signal is prepared by the TCP node B, the TCP acknowledgment signal is buffered and then appended to the MAC acknowledge signal in Step 40. The TCP acknowledgment responses from node B to node A are appended to the relatively short MAC acknowledgment, which need not contend for the medium. In one embodiment, the MAC layer acknowledgment of the TCP ACK is appended to another message 42 from node A to node B. The advantage of the system of FIG. 2B is that the overhead associated with the TCP acknowledge signal is significantly reduced, as well as contention avoided. As long as node A is sending data to node B, node B need not contend for the wireless medium.

In another embodiment, the TCP ACK message is appended only if link quality is excellent and hence MAC acknowledgments of the TCP ACK message is not required. In the rare occurrence that this leads to message delivery failure, the TCP layer will detect then failure and retransmit as required.

Figure 3:
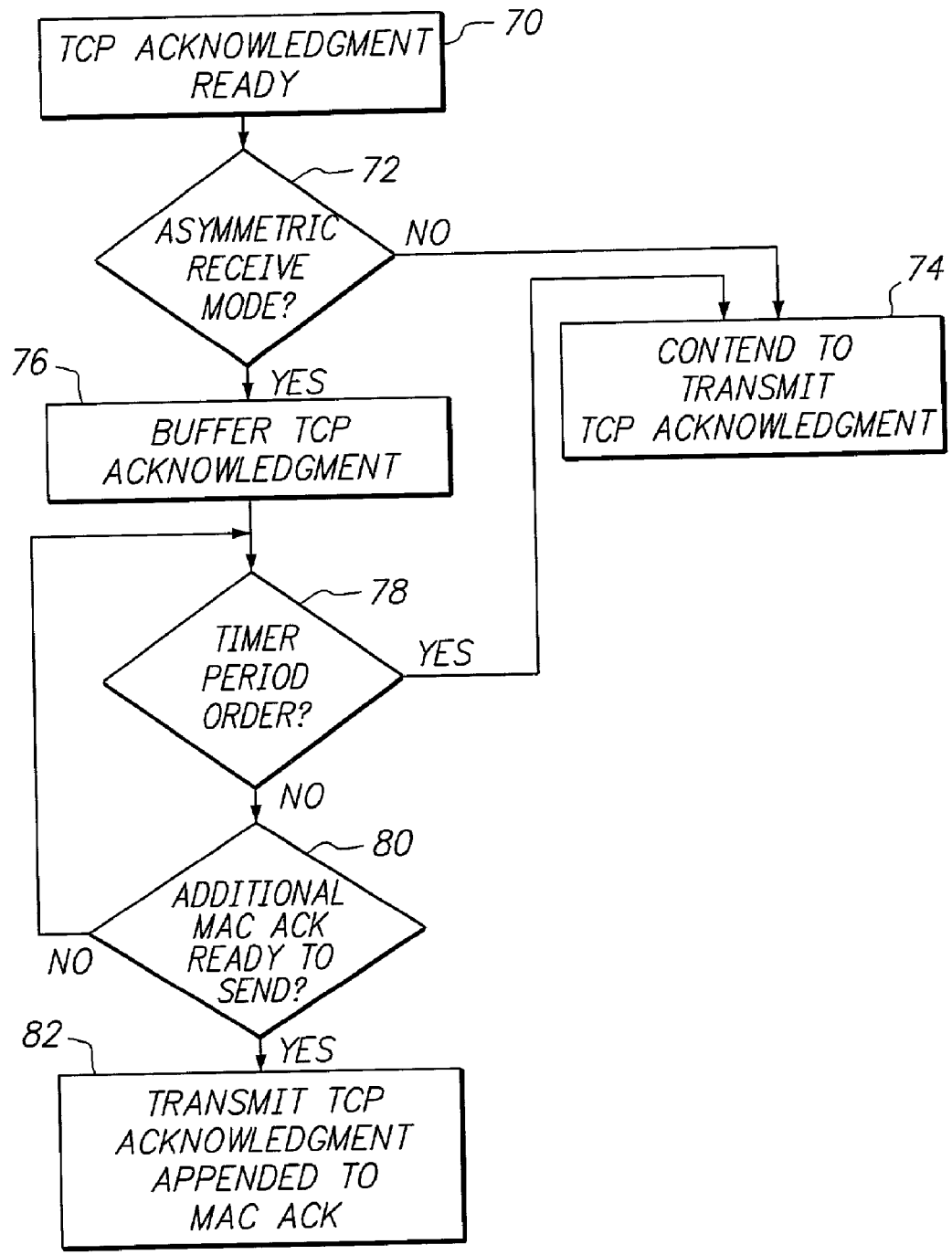
FIG. 3 is a flowchart that illustrates a method of one embodiment of the present invention.

FIG. 3 is a flowchart that illustrates an asymmetric receive mode for the wireless MAC layer. In Block 70, TCP acknowledgment is ready. In Block 72, checking is done to see whether the system is in the asymmetrical receive mode. If not, the system contends to transmit the TCP acknowledgment across the wireless medium in Step 74. If the system is in asymmetrical receive mode, the system buffers the TCP acknowledgment. The system stores the TCP acknowledgment until a MAC acknowledgment is ready to send. In Step 78, it is checked to see whether a timer period is over. If this time period is over, rather than continue to wait, the system moves to Step 74 to contend to transmit the TCP acknowledgment. In this way, the system does not buffer the TCP acknowledgment indefinitely.

In Step 80, it is checked to see whether an additional MAC layer acknowledgment is available to send. If not, the system loops back and waits. If so, however, in Step 82, the system transmits the TCP acknowledgment appended to the MAC layer acknowledgment.

Appending the TCP acknowledgment to the MAC layer ACK has two major impacts which improve CSMA/CA peak data rates:

1. The incremental time for the TCP ACK is simply the 64-byte length (plus an acknowledgment bit in the header of subsequent A→B packets). Thus the 2.4 ms TCP ACK packet of the previous SWAP example is now only about 0.1 ms.
2. The TCP ACK short messages are now completely removed from contention. This allows the system to optimize smaller contention windows (since no collisions occur) and longer multi-segment packets (since no collisions occur).

For the case of the Home RF SWAP protocol using a 10 Mb/s payload rate, the increase in peak data rate from this one new MAC technique is considerable—approximately 3 Mb/s to 5.5 Mb/s effective TCP throughput. The exact percentage improvement may be different for other WLAN protocols using CSMA/CA but it will always be positive for peak data rate.

The effect is diminished if the TCP Receive ACK Count is increased to much higher numbers such as 8 or 16 (Note: TCP Window size must also increase accordingly). However, there are currently nearly 100 million Windows-based devices for which ACK Count=2 is fixed and this new MAC protocol for WLANs based on CSMA/CA will benefit these existing devices.

In one embodiment, the nodes will buffer all messages to be sent that are below a predetermined size (these messages most likely being TCP ACKs). This buffering is preferably done when the channel quality is relatively good. The small sized messages are appended to a transmitter MAC acknowledgment.

It will be appreciated by those of ordinary skill in the art that the invention can be implemented in other specific forms without departing from the spirit or character thereof. The presently disclosed embodiments are therefore considered in all respects to be illustrative and not restrictive. The scope of the invention is illustrated by the appended claims rather than the foregoing description, and all changes that come within the meaning and range of equivalents thereof are intended to be embraced herein.

What is claimed is:

1. A wireless communication system protocol comprising:
   a wireless MAC layer providing for MAC layer acknowledgments; and
   a TCP layer providing for TCP layer acknowledgments, wherein at least one TCP layer acknowledgment is buffered by the wireless MAC layer and appended to a wireless MAC layer acknowledgment of MAC layer message.

2. The wireless communication system protocol of claim 1 wherein the wireless MAC layer is a modified CSMA/CA layer.

3. The wireless communication system protocol of claim 1 wherein the appending of a TCP layer acknowledgment to a MAC layer acknowledgment is done under conditions of asymmetrical traffic.

4. The wireless communication system protocol of claim 1 wherein the combined MAC layer acknowledgment and TCP layer acknowledgment does not need to contend for the wireless medium.

5. The wireless communication system protocol of claim 1 wherein the TCP layer acknowledgments are done in response to messages from another node.

6. The wireless communication system protocol of claim 5 wherein the other node appends an acknowledgment of the transmitted TCP layer acknowledgment along with another message transmitted by the other node.

7. The wireless communication system protocol of claim 1 wherein a MAC acknowledgment is sent to provide MAC layer acknowledgment of receipt of TCP acknowledgment appended message.

8. The wireless communication system protocol of claim 1 wherein the TCP acknowledgment is appended and sent only when link quality is very good.

9. A method for operating a MAC layer comprising:
   obtaining a TCP acknowledgment form a TCP layer, the TCP layer producing the TCP acknowledgment when a predetermined number of TCP messages are received;

buffering the TCP acknowledgment; and appending the TCP acknowledgment to a MAC acknowledgment of another message.

10. The method of claim 9 wherein the MAC layer comprises a modified CSMA/CA protocol.

11. The method of claim 9 wherein the other node appends another acknowledgment to a message in response to the TCP acknowledgment.

* * * * *